Nov. 17, 1936.                    W. J. BULLARD                    2,060,849
                            ELECTRICAL MEASURING DEVICE
                                 Filed Nov. 24, 1933

INVENTOR
W. J. BULLARD
BY H. A. Whitehorn
ATTORNEY

Patented Nov. 17, 1936

2,060,849

UNITED STATES PATENT OFFICE 2,060,849

ELECTRICAL MEASURING DEVICE

William J. Bullard, West Orange, N. J., assignor to Western Electric Company, Incorporated, New York, N. Y., a corporation of New York Application November 24, 1933, Serial No. 699,482

8 Claims. (Cl. 175—183)

This invention relates to an electrical measuring device, and more particularly to a device for measuring resistance.

An object of the invention is to provide a simple, efficient, and practical device for measuring the resistance of electrical articles and apparatus.

In accordance with the object, one embodiment of the invention comprises three polarized relays having sets of magnetically balanced coils, one set of the coils including one coil of each relay being included in a circuit with an article, the resistance of which is to be measured, another set of the coils being included in a circuit with a variable known resistance, while the coils of the other set are in a common circuit and electrically bias the armatures of the relays against their back contacts, the front contacts thereof being disposed in indicating lamp circuits so that different indications will be given if the article under test contains the correct amount of resistance or if the resistance thereof is too high or too low.

Figure 1:
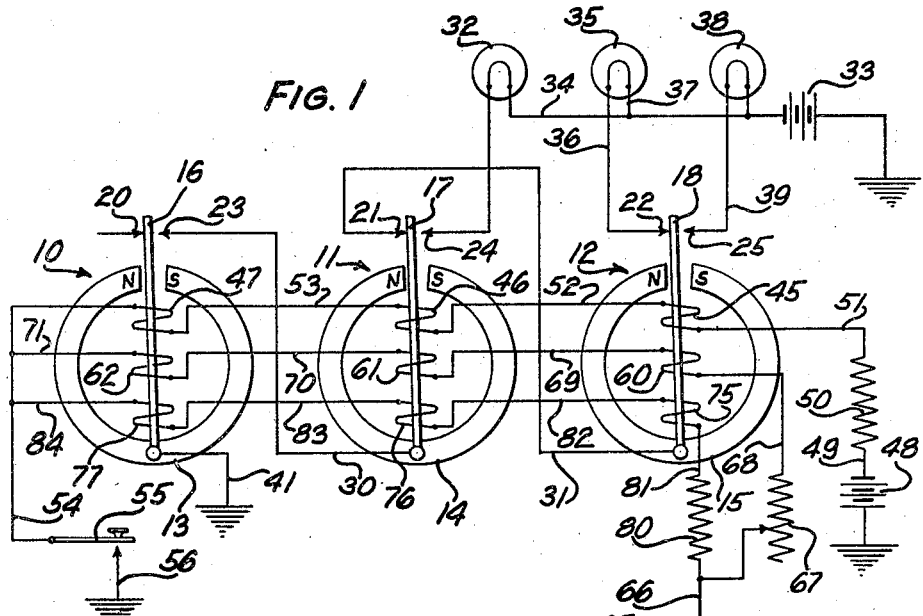
Figure 2:
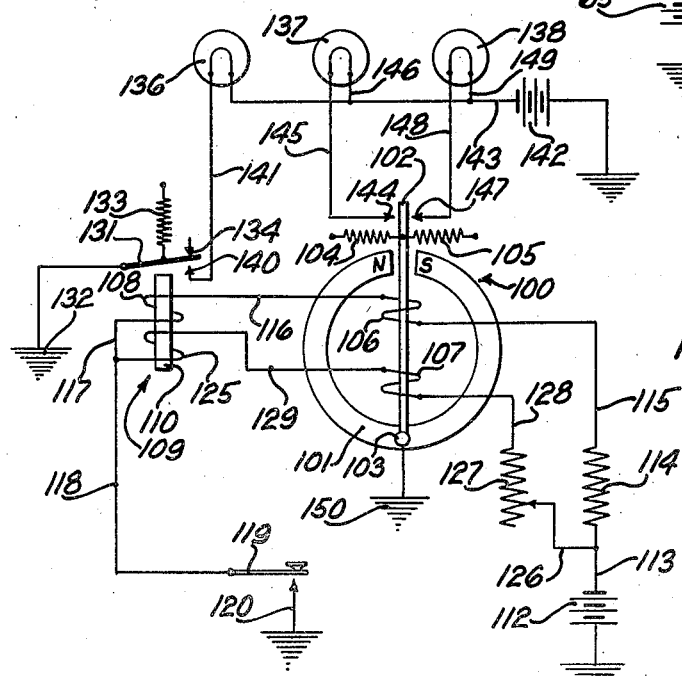

Other objects and advantages will be apparent from the following detailed description taken in conjunction with the accompanying drawing, wherein Fig. 1 is a wiring diagram illustrating one form of the invention, and Fig. 2 is a wiring diagram illustrating another form of the invention.

Referring now to Fig. 1 of the drawing, there are shown polarized relays 10, 11 and 12 having permanent magnets 13, 14 and 15, respectively, the north and south poles of which are respectively indicated by letters "N" and "S". Armatures 16, 17 and 18 are pivotally secured at their inner or lower ends to their respective magnets 13, 14 and 15, while their outer or free ends are positioned to engage the back contacts 20, 21 and 22, respectively, or front contacts 23, 24 and 25, respectively. The front contact 23 is connected to the armature 17 through a conductor 30 and the back contact 21 is connected to the armature 18 through a conductor 31. The front contact 24 is connected to one side of an indicating lamp 32, the other side of the indicating lamp being connected to a grounded battery 33. The back contact 22 is connected to one side of an indicating lamp 35 through a conductor 36, while the other side of the indicating lamp is connected to the battery 33 through a conductor 37. The front contact 25 is connected to one side of an indicating lamp 36 through a conductor 39 while the other side of the indicating lamp is connected to the battery 33. The armature 16 is connected to ground through a conductor 41. This completes the indicating circuit which will be described more in detail hereinafter.

Around the armatures 16, 17 and 18 are disposed three sets of coils, one set of which is in a test circuit including an unknown resistance of an article, the resistance of which is to be measured, another set being in a circuit including a known resistance and the third set being in a circuit which may be termed a biasing circuit.

The first or test circuit includes coils 45, 46 and 47, which circuit may be completed from a grounded battery 48 through a conductor 49, an unknown resistance 50, such as an apparatus or an article being measured, a conductor 51, the coil 45, a conductor 52, the coil 46, a conductor 53, the coil 47, a conductor 54 through a switch 55 when closed, a conductor 56 to ground.

The second or known resistance circuit includes coils 60, 61 and 62, which circuit may be completed from a grounded battery 65, through a conductor 66, a variable resistance 67, a conductor 68, the coil 60, a conductor 69, the coil 61, a conductor 70, the coil 62, a conductor 71, the conductor 54, the switch 55, the conductor 56 to ground.

The third or biasing circuit, which includes coils 75, 76 and 77, may be completed from grounded battery 65 through the conductor 66, a known fixed resistance 80, a conductor 81, the coil 75, a conductor 82, the coil 76, a conductor 83, the coil 77, a conductor 84, the conductor 54, the switch 55, the conductor 56 to ground.

The coils 45 and 60 of the relay 12 and the coils 46 and 61 of the relay 11 are parallel wound giving an extremely close inductive and resistive balance between the two windings of each relay and are so arranged that the coils of each relay will oppose each other so that if the current flow through each circuit containing these coils is the same the resultant magnetic force due to these coils will be zero. Furthermore, the coils 46 and 60 are so connected that the magnetic flux caused by current flow through these coils will tend to convert the upper ends of their armatures into south pole magnets whereas the coils 45 and 61 are so connected that the magnetic flux caused by current flow through these coils will tend to convert the upper ends of their respective armatures into north pole magnets. Therefore, as will be described more in detail hereinafter, the armatures 17 and 18 may be controlled by the unbalancing of the set of coils 46 and 61 and the set of coils 45 and 60.

The coils 47 and 62 are so arranged that they will aid instead of oppose each other to convert the upper end of the armature 16 into a north pole magnet when current passes through these coils. The coils 75, 76 and 77 of the biasing circuit are so arranged upon their respective armatures as to cause the upper ends thereof to be south pole magnets so as to be attracted by the north pole of their respective permanent magnets and thus normally bias the armatures against their respective back contacts. The purpose of the resistance 80 in the biasing circuit is to decrease current flow through the biasing coils 75, 76 and 77 to a minimum, so that there will be present a sufficient magnetic force to cause the armatures to be held against their back contact, but which force may be overcome by a slight unbalancing of the coils 45 and 60, or the coils 46 and 61.

When a test is to be made, the article 50 which may be an electrical apparatus, an electrical circuit or the like, is suitably connected in the test circuit after which the switch 55 is closed, completing the test circuit, the known resistance circuit, and the biasing circuit. As soon as these circuits are completed, the magnetic force of the coils 47 and 62 will convert the upper end of the armature 16 into a north pole overcoming the magnetic force of the coil 77, thus causing the armature 16 to be attracted by the south pole of the magnet 13 where the armature will engage its front contact 23 completing a circuit from grounded battery 33 through the conductor 34, the conductor 37, the indicating lamp 35, the conductor 36, the back contact 22, the armature 18, the conductor 31, the back contact 21, the armature 17, the conductor 30, the front contact 23, the armature 16, the conductor 41, to ground. When this circuit is completed the indicating lamp 35, which may be termed an O. K. lamp, is illuminated indicating that the resistance 50 is substantially equal to the resistance 67 if this be the case. Furthermore, during every test the armature 16 will be moved into engagement with its front contact 23, but variations in the resistances 50 and 67 will move either the armature 17 or the armature 18 into engagement with their respective front contacts, breaking the circuit to the O. K. lamp 35 and completing a circuit to the high indicating lamp 32, or the low indicating lamp 38. As for example, let it be assumed that the resistance 50 is higher or greater than the resistance 67. If such is the case, the current flow through the test circuit, which includes the resistance 50 with the coils 45 and 46, will be less than the current flow through the known resistance circuit, which includes the coils 60 and 61. The magnetic force of the coil 60 will therefore be greater than the magnetic force of the coil 45, thus aiding the biasing coil in holding the armature 18 against its back contact 22, whereas the magnetic force created by the current flow through the coil 61, will be greater than the magnetic force of the coil 46 and the biasing coil 76, thus converting the upper end of the armature 17 into a north pole magnet which will be attracted toward the south pole of the permanent magnet 14, and into engagement with the front contact 24. This actuation of the armature 17 will break the circuit to the O. K. lamp 35 and complete a circuit from the ground 33 through the conductor 34, the indicating lamp 32, the front contact 24, the armature 17, the conductor 30, the front contact 23, the armature 16, the conductor 41 to ground. The illumination of the indicating lamp 32 will indicate that the resistance 50 is higher than the resistance 67. If the resistance 50 is lower than the resistance 67, then a greater amount of current will flow through the coils 45 and 46 than will flow through the coils 60 and 61, resulting in the actuation of the armature 18 due to the fact that the magnetic force of the coil 45 is greater than the combined force of the coils 60 and 75 converting the upper end of the armature 18 into a north pole at which time it will be attracted toward the south pole of the permanent magnet 15 and into engagement with its front contact 25, completing a circuit through the indicating lamp 38. The armature 17 will retain its normal position in engagement with its back contact 21 as the magnetic force of the coil 46 which is greater than the magnetic force of the coil 61 will aid the biasing coil 76.

The form of the invention shown in Fig. 2 is slightly different from that shown in Fig. 1. In this form of the invention only one polarized relay is used, this relay indicated generally at 100. The relay 100 comprises a permanent magnet 101 having a north and south pole respectively indicated by letters "N" and "S". An armature 102 is pivoted at 103 which is its lower or inner end, the armature being biased by springs 104 and 105 to centrally position it between the poles of the permanent magnet 101. Around the armature 102 are disposed coils 106 and 107, the coil 106 being in a circuit with a coil 108 of a relay 109 the core of which is indicated at 110. This circuit may be completed from a grounded battery 112 through a conductor 113 an unknown resistance 114 which may be an electrical device or apparatus, the resistance of which is to be measured, a conductor 115, the coil 106, a conductor 116, the coil 108, a conductor 117, a conductor 118, a switch 119, a conductor 120 to ground. The coil 107 is in a circuit with another coil 125 of the relay 109 which circuit may be completed from the grounded battery 112 through the conductor 113, a conductor 126, a variable resistance 127, a conductor 128, the coil 107, a conductor 129, the coil 125, the conductor 118, the switch 119 when closed, the conductor 120 to ground.

An armature 131 of the relay 109 is grounded at 132 and is biased by means of a spring 133 against a stop 134. An indicating circuit includes indicating lamps 136, 137 and 138. A front contact 140 for the armature 131 is connected to one side of the indicating lamp 136 through a conductor 141, the other side of the indicating lamp being connected to a grounded battery 142 through a conductor 143. A back contact 144 for the armature 102 is connected to one side of the indicating lamp 137 through a conductor 145, the other side of the indicating lamp being connected to the conductor 143 through a conductor 146. A front contact 147 for the armature 102 is connected to the indicating lamp 138 through a conductor 148 the other side of the indicating lamp being connected to the conductor 143 through a conductor 149. The armature 102 which is a part of the indicating circuit just described is grounded at 150.

When testing the resistance of the article 114 which is properly connected in the circuit with the coils 106 and 108, the switch 119 is closed completing the two circuits containing the resistance 114 and the resistance 127, the resistance 127 being set at a predetermined amount. The coils 106 and 107 are so arranged upon the armature 102 that the magnetic forces thereof when energized will oppose each other, whereas the coils 108 and 125 of the relay 109 are so positioned that they will aid each other. Therefore, when the switch 119 is closed the armature 131 will be drawn into engagement with its front contact 140 completing a circuit through the indicating lamp 136. If the resistance 114 is equal to the resistance 127, the coils 106 and 107 will balance in opposing magnetic forces and the armature 102 will not be moved from its normal position. However, if the resistance 114 should be greater than the resistance 127, there will be a greater current flow through the coil 107 causing a greater magnetic force from the coil 107 than the coil 106 the result of which will polarize the armature so that it will be attracted to the north pole of the permanent magnet 101 moving the armature into engagement with its back contact 144 and completing a circuit from the grounded battery through the conductors 143 and 146, the indicating lamp 137, the conductor 145, the back contact 144, the armature 102 to ground 150. If the resistance 114 is lower than the resistance 127, there will be a greater flow of current through the coil 106 than through the coil 107 polarizing the armature 102 to be attracted toward the south pole of the permanent magnet 101 and into engagement with the front contact 147 to complete a circuit through the indicating lamp 138. Therefore, when a resistance 114 is not equal to the resistance 127, either the indicating lamp 137 or the indicating lamp 138 will be illuminated in addition to the indicating lamp 136. To determine the amount of variation in resistance, the variable resistance may be adjusted until whichever indicating lamp 137 or 138 is illuminated ceases to be so.

In the foregoing description of the two forms of the invention the unknown resistance which is being measured has been described as an article, but either form of the invention may be employed to test the resistance of circuits or various electrical apparatus without departing from the spirit and scope of the present invention. It is obvious also that the principle of the apparatus is not limited to use for comparing electrical impedances comprising merely resistance.

What is claimed is:

1. In an electrical measuring device, a plurality of indicating elements, an electrical circuit including an object the resistance of which is to be measured, a second circuit including a known resistance, each circuit being supplied with an equal electromotive force, a relay actuated by the current flow through one of said circuits for actuating one of said indicating elements if the resistive force of the object and the known resistance are equal, and means actuated by a difference in the electrical current through the circuits caused by a variation in resistive force of the object and the known resistance for selectively actuating others of said indicating elements.

2. In an electrical measuring device, a plurality of relays one of which is polarized, an electrical circuit comprising an unknown resistance and a coil for each relay, a second electrical circuit comprising a known resistance and a coil for each relay, the magnetic force of the coils of said polarized relay opposing each other while the magnetic force of the coils of the other relay aid each other, armatures for said relays controlled by the magnetic force of said coils, and indicating devices selectively actuated by said armatures.

3. In an electrical measuring device, a plurality of relays, an electrical circuit including an unknown resistance and a coil for each relay, a second electrical circuit including a known resistance and a coil for each relay, armatures for said relays, a plurality of indicating devices controlled by said armatures, a third circuit including a known resistance and a coil for each relay, said last mentioned coils biasing said armatures in a predetermined direction when energized, the coils of the first and second mentioned circuits for certain of the relays opposing each other, and so arranged that certain of the armatures will be actuated when there exists a variation in resistive force of the unknown resistance and the first mentioned known resistance to selectively actuate one of said indicating devices.

4. In an electrical measuring device, a relay having an armature and two coils opposing each other when energized, a circuit including an unknown resistance and one of said coils, a second circuit including a known resistance and the other coil, each circuit being supplied with an equal electromotive force, a plurality of indicating devices and a relay having a coil disposed in one of said circuits for energizing one of said indicating devices when said resistances are equal, a difference in resistance of said resistances varying the current flow through said coils, resulting in the actuation of the armature of said first mentioned relay to render ineffective the first mentioned indicating device and energizing one of the other indicating devices.

5. In an electrical measuring device, a relay having an armature and two coils opposing each other when energized, a circuit including an unknown resistance and one of said coils, a second circuit including a variable known resistance and the other coil, each circuit being supplied with an equal electromotive force, a plurality of indicating devices and a relay having a coil disposed in one of said circuits for energizing one of said indicating devices, a difference in resistance of said resistances varying the current flow through the coils of said first mentioned relay, resulting in the actuation of the armature to energize one of the other indicating devices and means for adjusting the variable known resistance until said second mentioned indicating device is de-energized to measure the variation in resistance of said unknown resistance from a desired value.

6. In an electrical measuring apparatus, a circuit having means for connecting therein a known resistance, a circuit having means for connecting therein an unknown resistance, means for supplying current to said circuits, devices for indicating respectively when the unknown resistance has a value bearing a desired relation to the known resistance, when its value is above said desired value and when its value is below said desired value, and means responsive to the currents in said circuits for selectively actuating said indicating devices, said current responsive means comprising polarized relay means having windings in said circuits and being normally biased in a direction to cause the actuation of said first mentioned indicating device.

7. In a device for measuring the resistance of an object, a plurality of relays, an electrical circuit arranged to include an object to be measured and a coil for each relay, a second electrical circuit comprising a known resistance and a coil for each relay, armatures for said relays actuated by the magnetic force of said coils, and indicating devices controlled by said armatures, the coils of said relays being so arranged that variation in resistance between the object and the known resistance will selectively actuate one of the armatures.

8. In a device for measuring the resistance of an object, a plurality of relays, an electrical circuit arranged to include an object to be measured and a coil for each relay, a second electrical circuit comprising a known resistance and a coil for each relay, armatures for said relays actuated by the magnetic force of said coils, and indicating devices controlled by said armatures, the coils of each of said relays being so arranged that their magnetic forces will balance when the resistances are equal and the armatures will be selectively actuated to energize one of the indicating devices when the resistances vary.

WILLIAM J. BULLARD.